Aug. 5, 1952 N. B. HAST ET AL 2,605,635
DEVICE FOR MEASURING SMALL LONGITUDINAL CHANGES
Filed Feb. 26, 1948
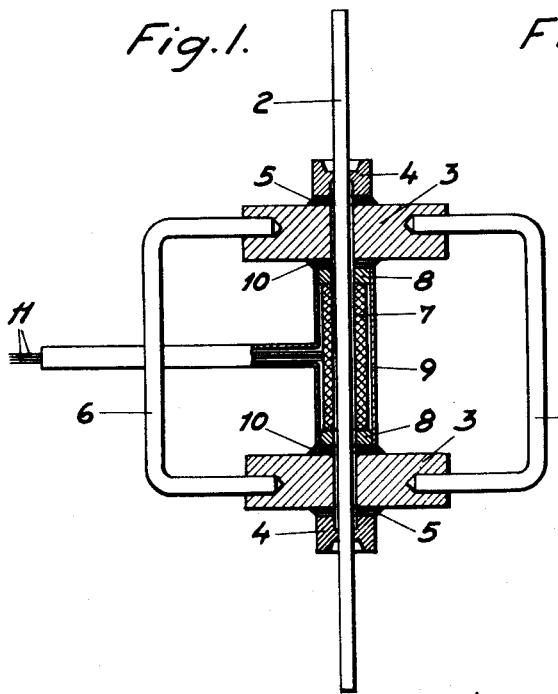
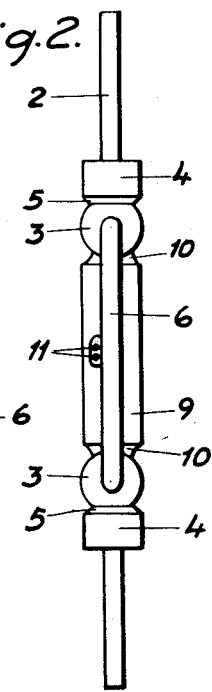
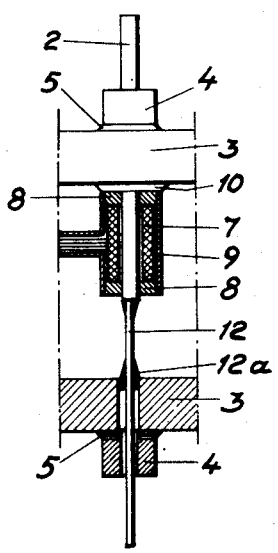
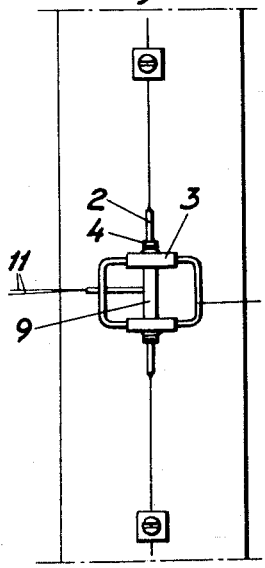
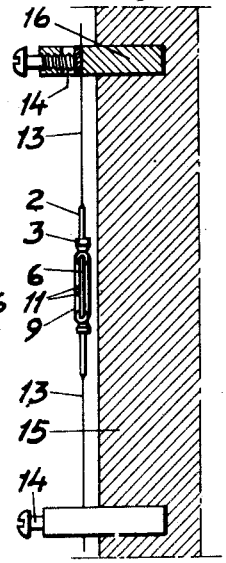
INVENTORS
NILS B. HAST
SVEN G. HAST
By Haseltine, Lake & Co.
AGENTS Patented Aug. 5, 1952

2,605,635

UNITED STATES PATENT OFFICE 2,605,635

DEVICE FOR MEASURING SMALL LONGITUDINAL CHANGES

Nils Bernhard Hast and Sven Gunnar Hast, Stockholm, Sweden

Application February 26, 1948, Serial No. 11,255
In Sweden December 13, 1945

Section 1, Public Law 690, August 8, 1946
Patent expires December 13, 1965

4 Claims. (Cl. 73—88.5)

The present invention relates to a device for measuring small longitudinal changes in concrete or other rigid bodies and is characterized by a measuring element in the form of a straight wire, strip or the like of nickel, iron nickel alloys or other magnetostrictive material to be provided with a measuring winding or coil of insulated wire placed around the same together with possibly a yoke placed outside the coil, suitably a thin tube of iron directly or indirectly soldered, welded or riveted or in any suitable way attached to two rigid crosspieces or washers placed at some distance from each other. The crosspieces are adapted to be mutually united through comparatively small bows, whereby is obtained a sufficiently stable measuring device with the possibility of imparting to the measuring element a tensile stress by means of the bows and which also protects the sensitive measuring wire from dislocation of its registering magnetostriction-capacities upon handling the measuring device. The alteration of inductance in the measuring coil may be recorded by means of some bridge-coupling, suitably an alternating current bridge or by measuring the voltage drop over the coil when constant alternating current passes through the same.

A suitable wire thinner than the measuring wire or element, with or without magnetostrictive properties, can be attached in the longitudinal direction to the one end or both the ends of the measuring wire and in this way the measuring range can be increased at the sacrifice of sensitivity.

When the nickel measuring wire is subjected to tensile stress or pressure the magnetic permeability of the nickel is changed to thereby change the inductance of the measuring coil, and this alteration in inductance can be recorded.

The wire in the measuring device, to be called the measuring wire may be given a certain tensile stress from the beginning by means of the bows of this invention, whereby the device becomes available for measuring both longitudinal diminutions and lengthenings ever with thin wires.

A certain heat-treatment of the wire-material is necessary if the magnetostrictive properties of the nickel or the iron-nickel alloys are to be obtained. Before calibration of the measuring device, which we thereinafter refer to as the measuring-cell, the device must be preloaded to a somewhat higher stress than is expected during use. If this preload is exceeded the calibration curve changes.

When the measuring-cell is used for measuring outside of a test-body, the measuring range can be increased by soldering wires of smaller diameter than the measuring-wire upon the ends of the same and the thin wires are fixed to the test-body. Besides, in this case the wire can be stressed again when the limit of the measuring range is reached, which will also increase the available range.

If the measuring-cell must be used for measuring while embedded in a body e. g. concrete, all parts of the measuring-cell except the cross pieces to which the wire is attached should be coated with a rubber-solution or the like, to prevent adhesion to the body.

Referring to the drawing wherein is shown an example of the device in accordance with the invention:

Fig. 1 shows a cross-section of a measuring-cell intended for placing in the body to be measured,
Fig. 2 shows a side-view of the measuring-cell,
Fig. 3 shows a modification of a measuring-cell intended for placing in the body to be measured, partly in cross-section. Figs. 4 and 5 show a front-view and a cross-section respectively of a measuring-cell, intended for external placing on the body to be measured.

In the measuring-cell shown in Figs. 1 and 2, the reference numeral 2 denotes a measuring wire of nickel, or other material having magnetostrictive properties, and having a wire diameter of suitably about 1 mm. The wire is placed loosely in the hole of the crosspieces 3 and is fastened to the little washer 4, by riveting or other suitable means. Between the cross pieces and the washers there is applied a tin-stratum 5, and it is to be noted that the surfaces for adhesion of the tin must be tinned previously. The cross-pieces 3 are united by bows 6, which are soldered, welded or in any other suitable way rigidly attached to the cross-pieces. A coil or measuring winding 7 of insulated cooperwire, e. g. 200 turns of enamelled 0.1 mm. wire, is wound on that portion of the wire 2 which is located between the crosspieces. The magnetic field of the coil is closed through iron washers 8 and a cylinder 9. A previous tensile stress in the wire can be obtained by providing that the bows 6 or the crosspieces 3 are loaded with a suitable known load whereupon one of the tin-strata 5 is first melted, and allowed to cool and when it is again congealed, the load is then taken away. Inasmuch as each of the tin strata 5 is thin, only 0.2–0.4 mm., the adhesion area of the same being comparatively large, and the stratum mainly being subjected to compression, the joint becomes sufficiently strong. A space between the washer 8 and the cross-piece 3 is filled with a stratum 10 of rubber-solution. The connections for the coil 7 are denoted by 11.

In the modification shown in Fig. 3 the same reference numerals have been used for the same parts as in the Figures 1 and 2. This modification differs from the previous one in that the nickel wire 2 is partly replaced by a thinner wire 12, which need not have magnetostrictive properties and is attached in a suitable way, e. g. soldered to the end of the thick nickel wire and to the washer 4. The coil 7 must be placed around the thick nickel wire. The thinner wire 12 is shown to have a covering of rubber. Through this arrangement the measuring range is increased considerably.

In the device shown in Figures 4 and 5 the same reference numerals have been used for the same parts as in previous figures. The two ends of the wire 2 outside the bows 6 are both elongated with a thinner wire 13 of steel or the like which by screw-arrangements 14 are attached to points of support 16, embedded in the body 15, the stresses of which are to be measured.

The invention is not restricted to the arrangements shown, inasmuch as the details can be varied in many ways without departing from the scope of the invention. The measuring wire 2 can be attached directly to the cross-pieces 3 e. g. riveted, welded or soldered, and the washers 4 will then be superfluous. Measuring with a magnetostrictive nickel wire without any bow-arrangement or the like to protect the nickel wire from bending influences is on the other hand probably impossible. The measuring wire preferably ought not to have a greater diameter than 1 mm. Such a heat-treated unprotected nickel wire is very sensitive as the magnetic properties change as soon as the preload is exceeded, and this preferably ought not to be more than 5–10 kg./mm.$^2$, otherwise the sensitivity would be too small.

Having now described our invention, what we claim as new and desire to secure by Letters Patent is:

1. A device for measuring small longitudinal changes in otherwise rigid bodies comprising a straight thin element of magnetostrictive material adapted to be connected to said rigid body and affected by the longitudinal changes, a measuring coil of insulated wire placed around said element, an iron tube surrounding said coil, a pair of iron washers each surrounding said element at opposite ends of said coil to complete the magnetic circuit of said coil, a pair of rigid crosspieces each surrounding said element at opposite ends of said iron washers, said crosspieces being joined together by at least one bow member, said cross members being adapted to be secured to said element whereby said bow member may impart a pre-load tension to said element and may protect said element from bending forces, and means to measure the variations of inductance in said coil due to longitudinal changes in the rigid body.

2. The device of claim 1 in which that part of said element lying between said crosspieces is comprised of a first portion of wire having magnetostrictive properties and a second portion of thinner wire attached in the longitudinal direction to said first portion, said measuring coil being placed around said first portion of said element.

3. The device of claim 1 in which at least one end of said element is secured to the outside of said body by means of a thin metal thread attached at one end in the longitudinal direction to said element and at the other end to said body, said thread being thinner than said element.

4. The device of claim 1 in which said element is secured to the outside of said rigid body to be measured by means of a pair of metal threads each of which is attached in the longitudinal direction to a respective end of said element, the other ends of said threads being attached to said body, said threads being thinner than said element.

NILS BERNHARD HAST.
SVEN GUNNAR HAST.

REFERENCES CITED

The following references are of record in the file of this patent:

UNITED STATES PATENTS

| Number | Name | Date |
| --- | --- | --- |
| 1,708,333 | Smith | Apr. 9, 1929 |
| 1,906,551 | De Forest | May 2, 1933 |
| 2,053,560 | Janovsky | Sept. 8, 1936 |

FOREIGN PATENTS

| Number | Country | Date |
| --- | --- | --- |
| 442,441 | Great Britain | Feb. 3, 1936 |